United States Patent [19]

Miller

[11] Patent Number: 5,467,899

[45] Date of Patent: Nov. 21, 1995

[54] DISPENSING DEVICE FOR FLOWABLE MATERIALS

[75] Inventor: Kenneth L. Miller, Indianapolis, Ind.

[73] Assignee: Liquid Control Corporation, North Canton, Ohio

[21] Appl. No.: 193,432

[22] Filed: Feb. 8, 1994

[51] Int. Cl.⁶ .............................. B67D 5/46; G01F 11/06
[52] U.S. Cl. ................... 222/309; 222/334; 222/340; 222/380; 222/504
[58] Field of Search .................... 222/333, 334, 222/380, 409, 504, 522, 556, 309, 340, 559

[56] References Cited

U.S. PATENT DOCUMENTS

| | | | |
|---|---|---|---|
| 3,162,336 | 12/1964 | Erickson | 222/504 X |
| 4,030,640 | 6/1977 | Citrin et al. | 222/504 X |
| 4,095,722 | 6/1978 | Miller | 222/1 |
| 4,293,010 | 10/1981 | Winiasz | 222/504 X |
| 4,381,099 | 4/1983 | Knedlik | 222/504 X |
| 4,974,754 | 12/1990 | Wirz | 222/504 X |
| 5,092,492 | 3/1992 | Centea | 222/137 |
| 5,148,946 | 9/1992 | Mizuta et al. | 222/504 X |
| 5,207,352 | 5/1993 | Porter et al. | 222/504 X |

OTHER PUBLICATIONS

Brochure: SCM/Dispensit, "SCM/Dispensit's On/Off Function", 1990.

*Primary Examiner*—Kevin P. Shaver
*Attorney, Agent, or Firm*—Sand & Sebolt

[57] ABSTRACT

A device which positively dispenses small, accurately measured, amounts of a flowable material, such as a resin, epoxy, etc. A pair of reciprocal pistons are movably mounted, each in a respective fluid pressure chamber, formed in a main body of a housing. One of the pistons moves a material dispense rod within a first section of a bore formed in a tubular portion of the housing. The second piston moves a sleeve which is telescopically mounted on the tubular housing between a material load position wherein flowable material is admitted into the first bore section, and a material discharge position wherein the first bore section is in communication with the second bore section. The dispense rod is moved into the first bore section to positively displace a predetermined amount of material from the device by movement of this same amount of material from the first bore section into the second bore section through a communication channel formed in the sleeve, thereby dispensing the same amount of material from a material outlet opening of the second bore section with each stroke of the dispense rod.

23 Claims, 4 Drawing Sheets

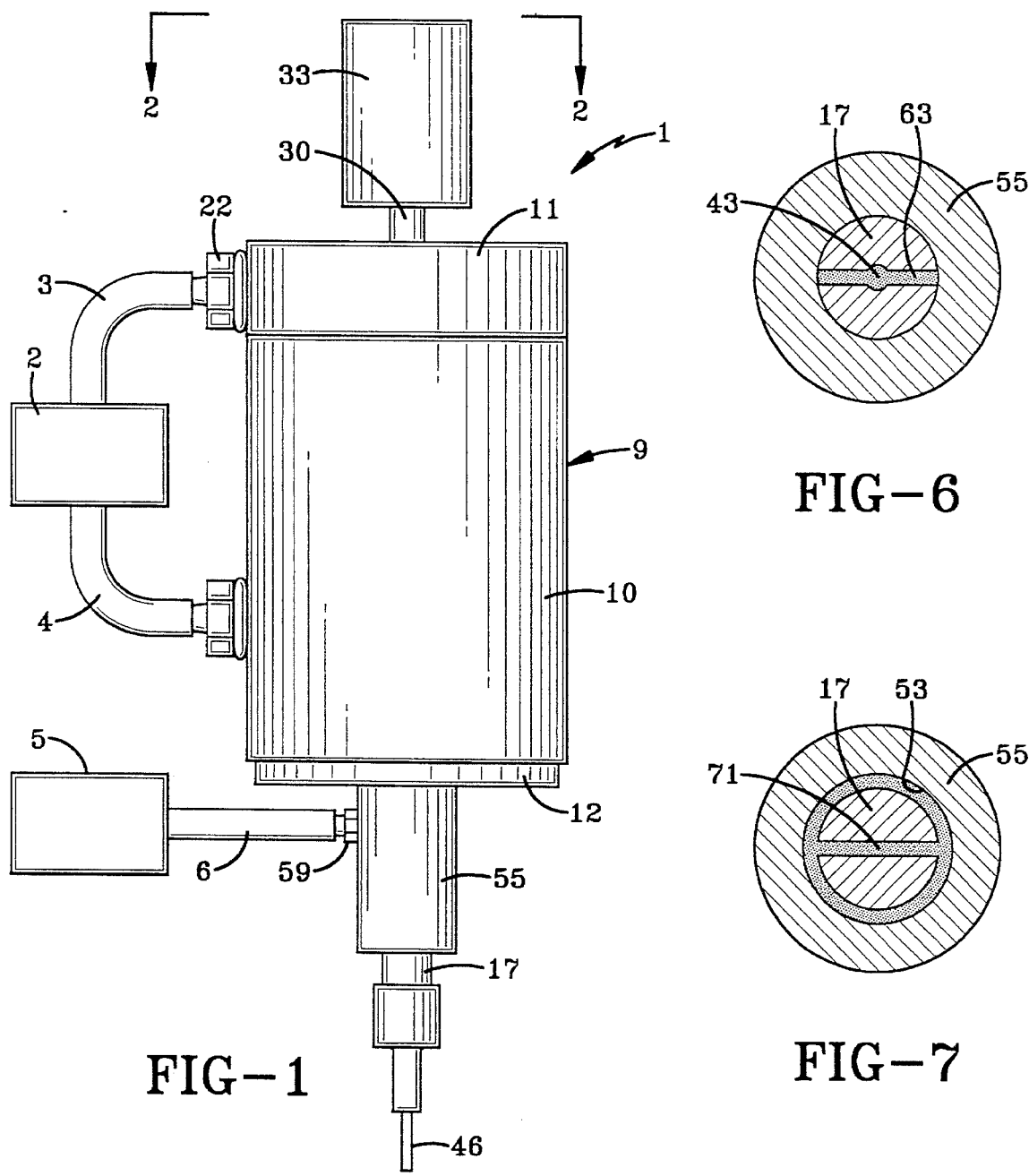
FIG-1
FIG-6
FIG-7
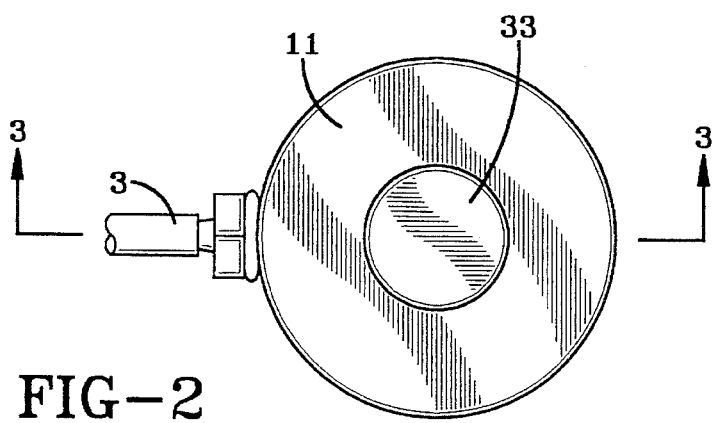
FIG-2

DISPENSING DEVICE FOR FLOWABLE MATERIALS

BACKGROUND OF THE INVENTION

1. Technical Field

The invention relates to dispensing equipment and in particular to a dispensing device for dispensing flowable materials such as resins, epoxies, etc. in a positively controlled manner. More particularly, the invention relates to a dispensing device for dispensing small amounts of a flowable material in an accurate, repeatable, positive manner.

2. Background Information

Various dispensers have been developed for the deposition in small accurately controlled shot applications of a flowable material, such as adhesives, sealants, lubricants or the like. Although it is relatively easy to dispense individual shots of such material, it becomes increasingly difficult when the amount dispensed is an extremely small shot size, for example, 0.001 cc and smaller, especially when the various materials being dispensed have a wide range of viscosities. Heretofore, many such dispensing devices and mechanisms use a spring biased check valve. However, it is difficult to accurately control the flowable material or liquid being dispensed, especially when in a very small shot application, with such spring-biased valves due to the inability to accurately control and maintain the spring rate. It is furthermore necessary that when dispensing such small shot sizes of material that the fluid flow be dripless.

One known dispensing device is shown in U.S. Pat. No. 4,095,722 which involves filling a portion of a tube with material and then isolating a portion of the material to be dispensed by pinching off sections of a tube containing the material for subsequently dispensing to ensure that only the amount of material in the pinched off area is dispensed.

Various types of positive displacement devices and systems using this pinch-off tube concept for dispensing a single shot of material was distributed by former SCM Metal Products, Inc. of Indianapolis, Ind., under the trademark SCM/DISPENSIT. Another type of system for dispensing a single shot or drop of fluid was also distributed by SCM Metal Products, Inc., and identified as its 1000 Series positive displacement dispenser.

Although these prior art small shot or drop dispensers are satisfactory for many applications, it is desirable to provide an improved dispenser for dispensing small shots of a flowable material in a positive manner, which is dripless, and which operates with continual repeatable accuracy despite changing viscosities and types of materials, and which will accommodate a wide range of material viscosities, reduces maintenance and changeover costs, eliminates post dispensing drippage, and provides an efficient and dependable device for dispensing such small shots of a flowable material.

SUMMARY OF THE INVENTION

Objectives of the invention include providing a dispenser for accurately dispensing small shots or size dots of various flowable materials in which the device is relatively portable and lightweight, and which can be hand held or mounted on a support structure.

A still further objective of the invention is to provide such an improved dispenser which controls overrun discharge and prevents dripping after the desired amount of material has been dispensed, and which can provide a "snuff back" effect.

Another objective of the invention is to provide such a dispenser which eliminates the use of any spring biased ball check valves, which will permit the size of the dot or shot of material to be readily varied, and which ensures the consistent continually repeatable dispensing of the selected shot size.

A still further objective is to provide such a dispenser which is of a simple construction, which achieves the stated objectives in a simple, effective and inexpensive manner, and which satisfies problems and solves needs existing in the art.

These and other objectives and advantages of the invention are obtained by the improved dispenser of the invention, which dispenses a predetermined amount of a flowable material from a supply of such material, the general nature of which may be stated as including, a housing formed with a material receive chamber and a separate material dispense chamber, the receive chamber having a material inlet opening and the dispense chamber having a material outlet opening; first means movable between first and second portions for selectively providing material communication between the material receive and dispense chambers; the first means permitting the flow of material between the material receive and dispense chambers, and for trapping the material in the receive chamber by blocking the material inlet opening when in the first position, and for preventing communication between the receive and dispense chambers and for unblocking the material inlet opening when in the second position; second means for forcing the predetermined amount of material out of the receive chamber and into the dispense chamber and subsequently out of the material outlet opening when the first means is in the first position wherein the receive chamber is in communication with the dispense chamber; and third means for selectively moving the first means between the first and second positions.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 1 is a generally diagrammatic elevational view of the new dispensing device of the present invention connected to a material supply and to a source of pressurized air;

FIG. 2 is a top plan view of the dispensing device looking in the direction of arrows 2—2, FIG. 1;

FIG. 6 is an enlarged sectional view taken on line 6—6, FIG. 3; and

FIG. 7 is an enlarged sectional view taken on line 7—7, FIG. 4.

Similar numerals refer to similar parts throughout the drawings.

DESCRIPTION OF THE PREFERRED EMBODIMENT

The improved dispenser of the present invention is indicated generally at 1, and is shown in FIG. 1 connected to a source of pressurized fluid 2, such as an air compressor, by supply lines 3 and 4, and to a remote source 5 of a generally incompressible, flowable material to be dispensed, by a material supply line 6.

Figure 3:
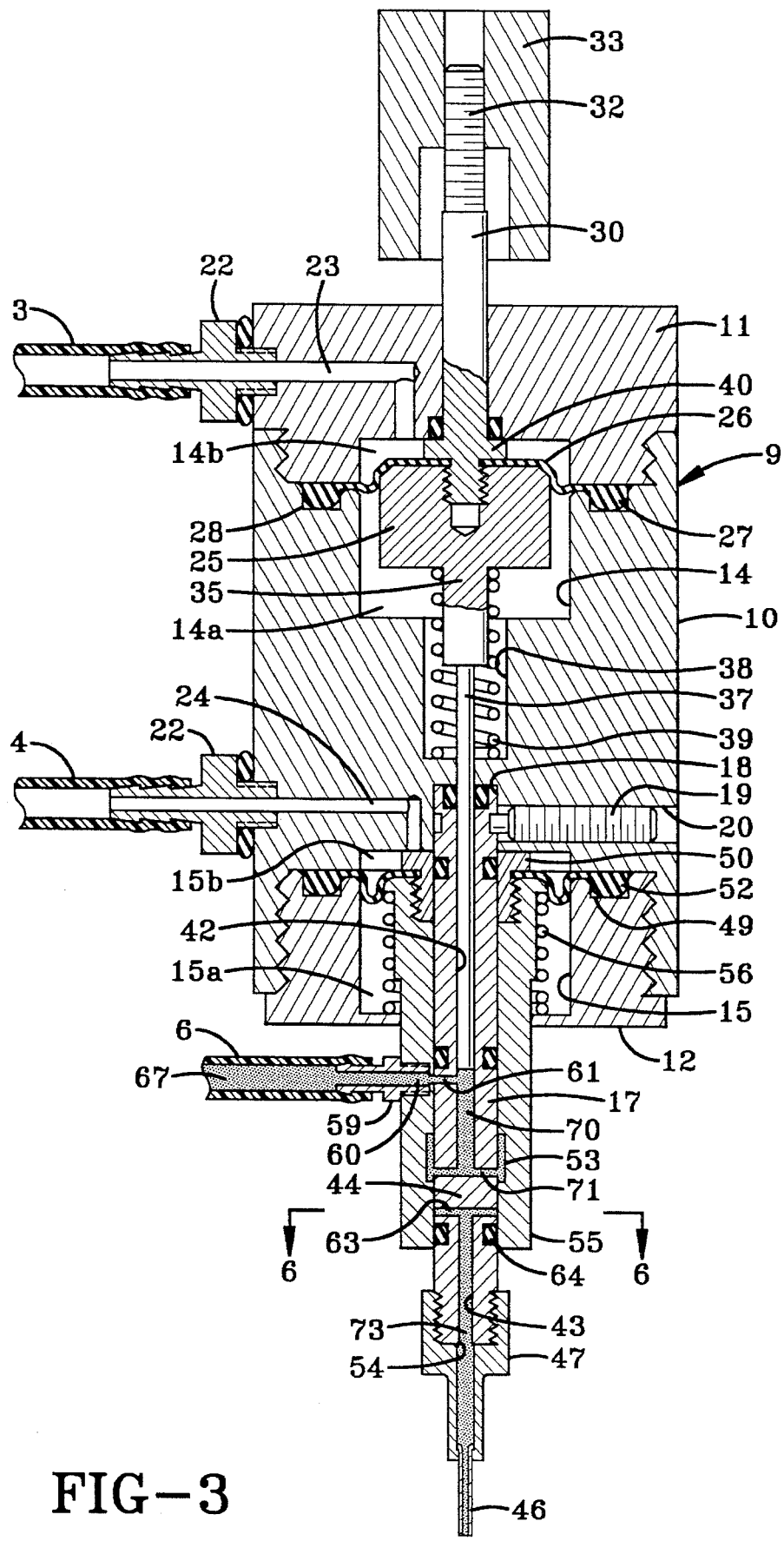
FIG. 3 is an enlarged sectional view taken on line 3—3, FIG. 2, with the device being shown in the ready-to-fill or load position.
Figure 4:
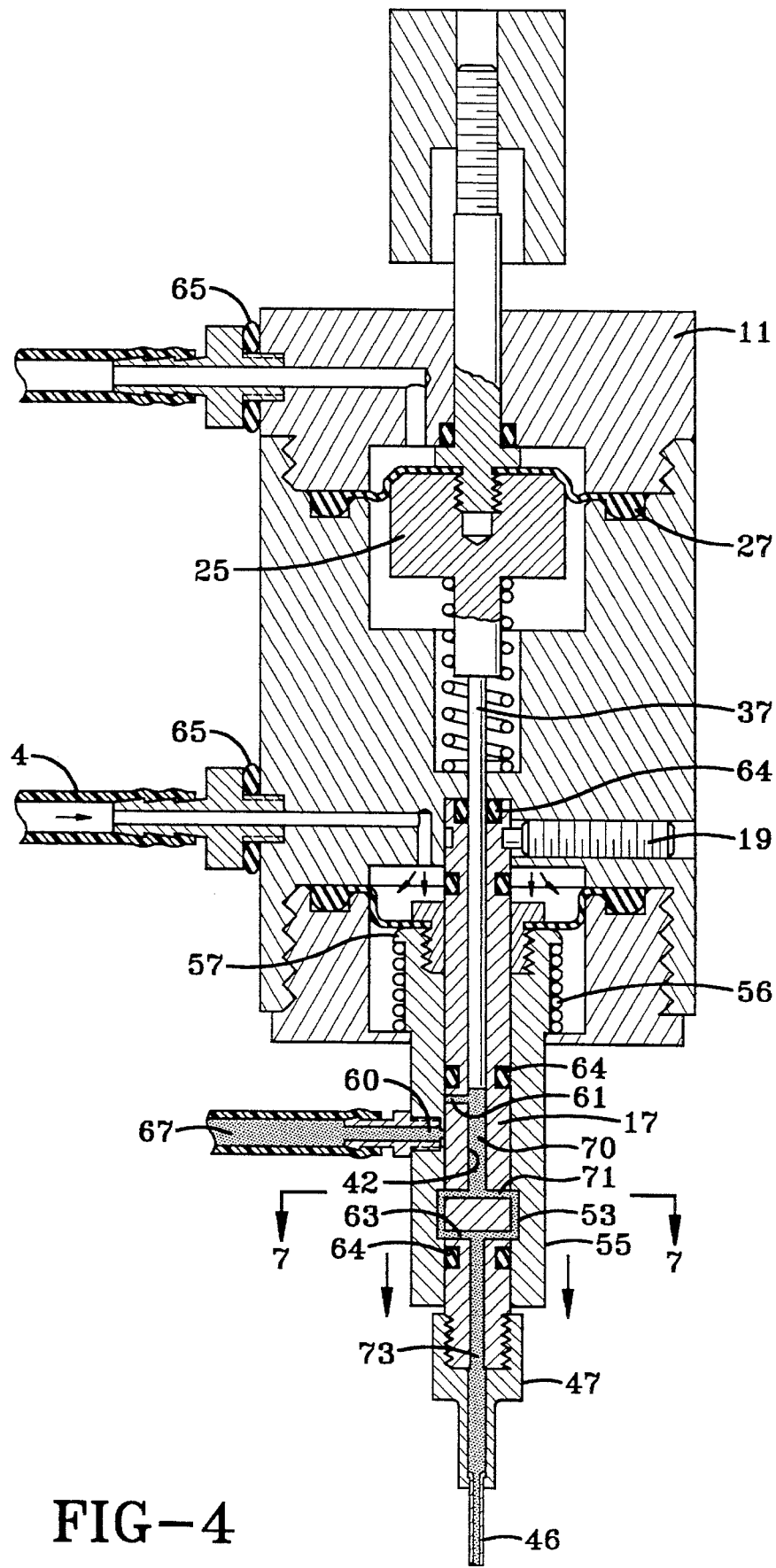
FIG. 4 is a sectional view similar to FIG. 3, with the material receive chamber in communication with the material dispense chamber.
Figure 5:
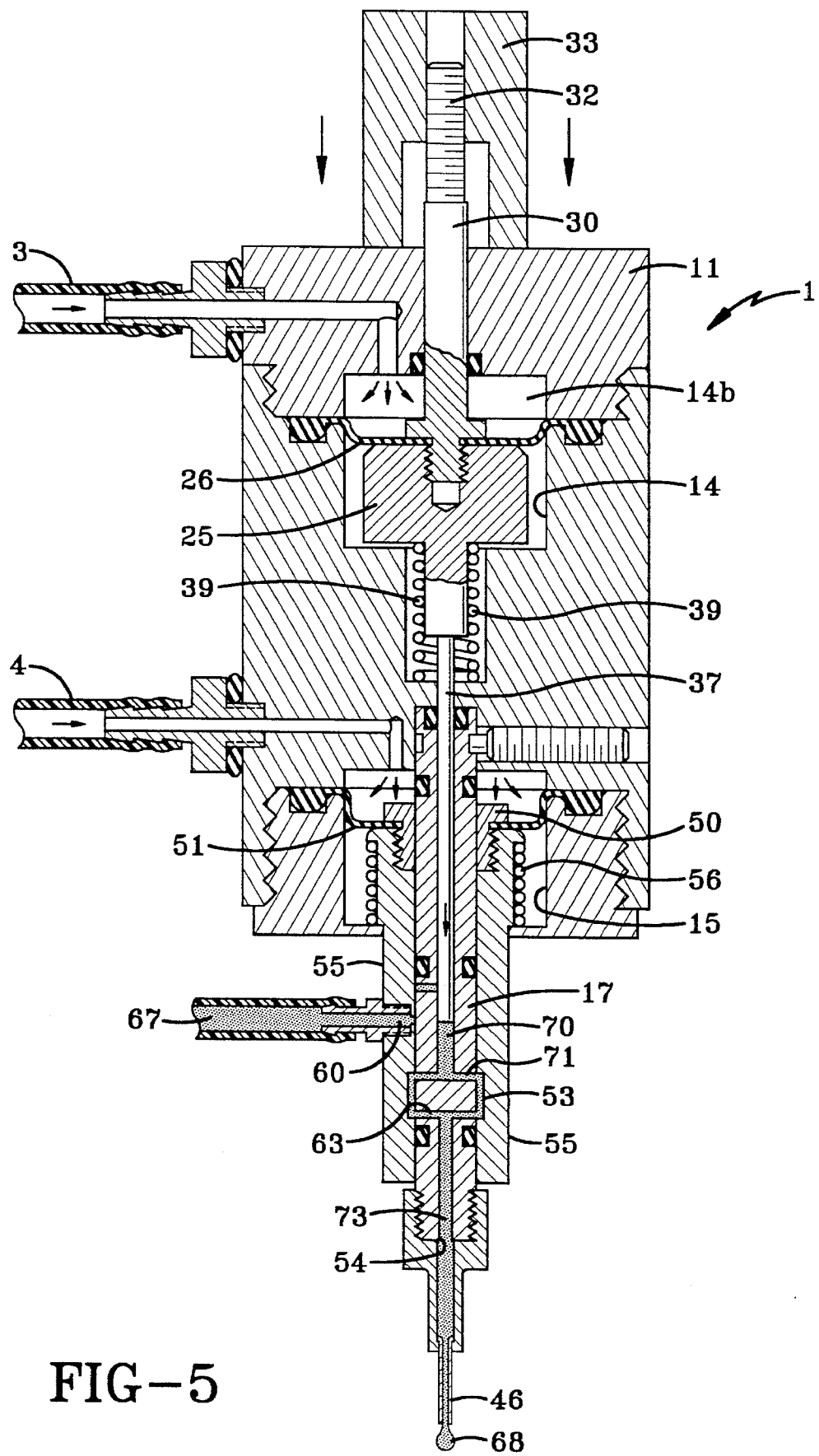
FIG. 5 is a sectional view similar to FIG. 4 with a shot of material being dispensed from the material dispense chamber by the displacement rod.

Dispenser 1 is shown in detail in FIGS. 3–5, and includes a housing, indicated generally at 9, which has a main body 10, preferably cylindrical in shape. Body 10 has a top end cap 11 and a bottom end cap 12, threadably mounted on the ends thereof. A first fluid pressure chamber 14 is formed within the top end of body 10, and a second fluid pressure chamber 15 is formed mainly in end cap 12 and the bottom end of body 10.

In accordance with one of the features of the invention, housing 9 includes an elongated tubular portion 17, an upper end of which is seated within an annular recess 18 formed in the bottom of housing body 10 adjacent bottom fluid chamber 15. Tubular portion 17 is removably mounted within recess 18 of body 10 by a set screw 19, which is threadably engaged within a threaded opening 20 formed in body 10.

Air supply lines 3 and 4 communicate with fluid pressure chambers 14 and 15, respectively, through quick-connect couplers 22 and associated fluid pressure passages 23 and 24. Fluid passage 23 is formed in end cap 11, and passage 24 is formed in the lower end of body 10.

A piston 25 is movably mounted within fluid pressure chamber 14 and is connected to a flexible elastomeric diaphragm 26 which extends across fluid pressure chamber 14. Enlarged bead ends 27 of diaphragm 26 are clamped within an annular recess 28 by end cap 11. Diaphragm 26 divides chamber 14 into a pair of compartments 14a and 14b, with piston 25 being located within compartment 14a, with compartment 14b being a fluid-tight compartment into which the incoming pressurized air is supplied for reciprocally moving piston 25 within chamber 14.

An adjusting post 30 has a bottom end threadably engaged and connected to an upper end of piston 25, with a top second end 32 being threadably connected to an adjustment stop block 33.

Piston 25 includes an outwardly extending cylindrical reduced diameter portion 35, which is connected to a material displacement rod 37. Cylindrical portion 35 is reciprocally mounted within an annular recess 38 formed in housing body 10 adjacent chamber 14. A compression coil spring 39 surrounds cylindrical portion 35 and an upper part of displacement rod 37, and biases piston 25 upwardly toward the top of its stroke, as shown in FIG. 3, until an annular collar 40 on the lower end of adjustment post 30, contacts end cap 11.

An axially extending bore is formed in tubular housing portion 17 and includes an upper or first bore section 42 into which material displacement rod 37 extends, and a lower or second bore section 43 which is axially aligned with first bore section 42 but is separated therefrom by a partition 44. A lower portion of bore section 42 forms a material receive chamber 70, and bore section 43 forms a material dispense chamber 73. A hollow dispensing tip 46 is mounted on the bottom end of tubular housing portion 17 by a hollow mounting collar 47 and communicates with a material outlet opening 54 of bore section 43.

A second piston 50 is mounted within pressure chamber 15 and is connected to a second elastomeric flexible diaphragm 51 which extends across chamber 15 and terminates in an annular end bead 52, which bead is clamped within an annular recess 49 formed in end cap 12. Diaphragm 51 separates chamber 15 into bottom and top compartments 15a and 15b, respectively.

Piston 50 is threadably mounted into an upper end of a hollow sleeve 55, which is telescopically slidably mounted on fixed tubular housing portion 17. A compression coil spring 56 is mounted about the upper end of sleeve 55, and presses against a top annular flange 57, to bias sleeve 55 and piston 50 upwardly into chamber 15 to the position shown in FIG. 3.

In accordance with one of the features of the invention, an annular recess 53 is formed on the interior of sleeve 55 and extends a short axial distance therealong (FIGS. 3–5 and 7). Material inlet feed line 6 is connected to a coupler 59 which is threadably mounted within a material inlet passage 60 which is formed in sleeve 55. When in a material receive position, inlet passage 60 radially aligns with and communicates with a material inlet opening 61 which extends radially through sleeve 17 and into first bore section 42.

A through opening 63 (FIGS. 3 and 6) is formed in tubular housing portion 17, and communicates with and forms a T-junction with the second bore section 43. A plurality of sealing O-rings 64 are mounted in annular recesses formed in tubular housing portion 17 to provide for an airtight sliding connection between tubular housing portion 17 and movable sleeve 55. Thus pressurized air, which enters compartment 15b through fluid passage 24, will act upon piston 50 and will not escape through the sliding connection between housing portion 17 and movable sleeve 55. Other O-rings 65 are mounted between couplers 22 and housing body 10 to provide an airtight seal.

The operation of dispensing device 1 is best illustrated in FIGS. 3–5. FIG. 3 depicts device 1 in the material receive or load position. The lower or second bore section 43 and dispensing tip 46 is shown filled with a flowable material 67 from a previous cycle of operation. It is readily understood that upon initial actuation of dispenser 1, several cycles may be required to initially fill bore section 43 and dispensing tip 46.

When in the material receive position of FIG. 3, material inlet opening 61 of tubular housing portion 17 will align with material inlet passage 60 in sleeve 55, which has been moved to its uppermost position by the biasing force of coil spring 56. When in this material receive position, the air pressure is shut off from line 4 by well-known control means. In order to dispense the desired shot size or dot of material which is represented at 68 in FIG. 5, well-known material control systems will be actuated, forcing a predetermined amount of material 67 through line 6 and into material receive chamber 70 located between the bottom of dispensing rod 37, and a radial through opening 71. Opening 71 is formed in housing portion 17 and is parallel with through opening 63 and separated therefrom by partition 44 and forms a material outlet opening for receive chamber 70.

After material receive chamber 70 is filled with material 67, which occurs in a very small and readily ascertainable amount of time, appropriate control systems will be actuated to supply air pressure through line 4 and into upper compartment 15b of pressure chamber 15. This pressurized air moves piston 50 and connected sleeve 55 downwardly from the material receive position of FIG. 3 to the material dispense position of FIG. 4. In this position annular recess 53 of sleeve 55, which was in communication with outlet opening 71 of receive chamber 70, and, correspondingly, was filled with material 67, is in communication with outlet opening 71 of receive chamber 70 and inlet opening 63 of the material dispense chamber, to provide communication between material receive chamber 70 and material dispense chamber 73.

After sleeve 55 is moved downwardly from the material receive position of FIG. 3 to the material dispense position of FIG. 4 by the introduction of pressurized air through line 4, the appropriate air control supply is actuated to supply pressurized air through line 3 and into upper compartment 14b of chamber 14. This moves piston 25 downwardly within compartment 14, and, correspondingly, moves dispensing rod 37 within upper bore section 42 and into material receive chamber 70, as shown in FIG. 5, to force an exact predetermined amount of material 67 from material receive chamber 70 through annular recess 53 of sleeve 55, and into material dispense chamber 73. This material movement will thus force the exact same amount of material from chamber 73 through outlet opening 54 and out of dispensing tip 46, to form the desired shot or dot size 68 of material 67. The stroke of displacement rod 37, as well as the diameter of material receive chamber 70, determines the size of shot 68 or amount of material being dispensed at each dispense stroke. The stroke length is controlled by the adjustment setting of stop block 33, which, as shown in FIG. 5, abuts the top surface of end cap 11, to limit the downward stroke of rod 37 and piston 25. Thus, to obtain a longer stroke length, and thus a larger shot 68, stop block 33 is threadedly moved along threaded end 32 of adjustment post 30 to increase the separation or space between end cap 11 and stop block 33, as shown in FIGS. 3 and 4.

After material shot 68 has been dispensed, the pressurized air supply to piston 25 through line 3 is exhausted, which enables spring 39 to return piston 25 from the discharge position of FIG. 5 to the reload or material receive position of FIG. 3. This also moves dispense rod 37 upwardly within the bore of housing portion 17 to provide a snuff-back effect on the material remaining in dispense chamber 73 and tip 46 to prevent drippage. Generally simultaneously with the removal of pressurized air to piston 25, the pressurized air source to piston 50 through line 4 is removed, enabling coil spring 56 to return piston 50 and sleeve 55, from the material discharge position of FIG. 5 to the material receive position of FIG. 3.

Thus, in accordance with one of the main features of the invention, when in the material receive position of FIG. 3, annular recess 53 of sleeve 55 is out of communication with material dispense chamber 73 and in communication with material receive chamber 70 and material inlet passage 60 of sleeve 55. Likewise, when in the material discharge position of FIG. 5, annular recess 53 provides the necessary communication between material dispense chamber 73 and material receive chamber 70 through openings 63 and 71 formed in tubular housing portion 17.

Thus, the sliding movement of sleeve 55, in combination with the controlled movement of displacement rod 37, provides for the accurately controlled movement of a precise amount of material from the material receive chamber into the material dispense chamber, which then forces the corresponding amount of material out of the open end of dispensing tip 46 to form the desired size of dispensed shot 68, as shown in FIG. 5.

Although dispenser 1 described above can be used for various shot sizes, it has found particular application for accurately delivering very small sizes or dots of material each cycle, in the range of 0.001 cc and smaller, but need not be limited to such size applications.

Furthermore, in accordance with one of the features of the invention, there are no spring-biased check valves to control the flow of material, and the material flow is accurately and positively controlled by the positive controlled movement of sleeve 55 and rod 37. Thus, the only springs that are used return the pistons to their unpressurized position, and do not control the actual dispensing of the material, the same being accomplished by rod 37 and sleeve 55.

In accordance with another advantage of dispensing device 1, the shot size or dot of material being dispensed each cycle can be adjusted easily by rotation of stop block 33, as described above. Likewise, if additional capacity is required, a different tubular housing portion 17 can be inserted within the hollow interior of sleeve 55 which has a larger interior bore by easily removing housing portion 17 by loosening of set screw 19. This would also require replacement of displacement rod 37 with a rod having the same size diameter as the bore diameter of the new replacement housing portion 17. However, none of the other components of dispenser 1 will require replacement, thereby enabling a wide range of shot sizes to be achieved with a minimal amount of replacement parts.

Accordingly, the dispensing device of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved dispensing device is constructed and used, the characteristics of the construction, and the advantageous, new and useful results obtained; the new and useful structures, devices, elements, arrangements, parts and combinations, are set forth in the appended claims.

I claim:

1. A dispenser for dispensing a predetermined amount of a flowable material from a supply of said material including:

a housing formed with a material receive chamber and a separate material dispense chamber, said receive chamber having a material inlet opening and said dispense chamber having a material outlet opening;

first means movable between first and second positions for selectively providing material communication between said material receive and dispense chambers, said first means permitting the flow of material between the material receive and dispense chambers and for trapping said material in said receive chamber by blocking the material inlet opening when in the first position, and for preventing communication between said receive and dispense chambers and for unblocking the material inlet opening when in the second position to permit the flow of material into the receive chamber, and for blocking the material inlet opening before providing communication between the receive and dispense chambers when moving between the second and first positions;

second means for forcing a predetermined amount of material out of the receive chamber and into the dispense chamber and subsequently out of the material outlet opening when said first means is in the first position wherein the receive chamber is in communication with the dispense chamber and the material inlet opening is blocked; and third means for selectively moving the first means between the first and second positions.

2. The dispenser defined in claim 1 in which the housing has a main body and tubular portion; and in which the tubular portion is formed with an axial bore, a first portion of which forms the material receive chamber.

3. The dispenser defined in claim 2 in which the second means includes a material displacement rod slidably mounted in the bore of the tubular portion of the housing.

4. The dispenser defined in claim 3 in which the second means further includes a first pressure-controlled piston engageable with the displacement rod for slidably moving said rod into the material receive chamber.

5. The dispenser defined in claim 3 in which the second means further includes spring means for moving the displacement rod outwardly from the material receive chamber.

6. The dispenser defined in claim 4 in which the main body of the housing is formed with a first pressure chamber which communicates with a pressurized fluid supply; and in which the first piston is reciprocally movably mounted in said first pressure chamber.

7. The dispenser defined in claim 6 in which a first elastomeric diaphragm separates the first pressure chamber into first and second compartments; in which the first compartment is adapted to communicate with the pressurized fluid supply; and in which the first piston is located within the second compartment.

8. The dispenser defined in claim 7 in which the first piston is connected to the flexible diaphragm for movement with said diaphragm.

9. The dispenser defined in claim 4 in which adjustable stop means is operatively engaged with the first piston for limiting the sliding movement of the displacement rod into the material receive chamber to regulate the amount of material discharged through the outlet opening of the dispense chamber.

10. The dispenser defined in claim 9 in which the stop means includes a post attached at one end to the first piston; and in which a stop block is adjustably mounted on a second end of the post for limiting movement of the first piston.

11. The dispenser defined in claim 2 in which the first means includes a sleeve reciprocally telescopically slidably mounted on the tubular portion of the housing and movable between the first and second positions; and in which the third means includes a pressure-actuated means for moving said sleeve from the second to the first position.

12. The dispenser defined in claim 11 in which the pressure actuated means includes a second pressure chamber and a second piston reciprocally movably mounted in said second chamber; and in which said second piston is operatively engaged with the sleeve for moving said sleeve along the tubular portion of the housing.

13. The dispenser defined in claim 12 including second spring means for biasing the sleeve toward the said second position.

14. The dispenser defined in claim 13 in which a second flexible diaphragm separates the second pressure chamber into a pair of compartments; and in which the spring means and second piston are located in respective ones of said compartments.

15. The dispenser defined in claim 11 in which the material dispense chamber is a second portion of the axial bore of the tubular housing portion; in which a pair of radially extending openings is formed in the tubular housing portion and forms the material inlet opening and a material outlet opening for the material receive chamber; in which another radially extending opening is formed in the tubular housing portion and communicates with the material dispense chamber and forms an inlet passage for said material dispense chamber; and in which the sleeve is formed with an elongated annular inner chamber which provides communication between the material outlet opening of the material receive chamber and the material inlet opening of the material dispense chamber when the sleeve is in the first position.

16. The dispenser defined in claim 1 in which a dispensing tip is mounted on the housing and communicates with the outlet opening of the dispense chamber.

17. The dispenser defined in claim 2 in which the tubular portion is removably mounted within the main body of the housing and is retained therein by a fastening member.

18. A dispenser for dispensing a small measured amount of a flowable material from a supply of said material including:

a housing having a main body formed with a first fluid pressure chamber which is adapted to be connected to a source of fluid pressure;

a first piston movably mounted in the first fluid pressure chamber;

a material dispense rod movable in a material dispense direction by the first piston;

first spring means for biasing the piston and dispense rod in a direction opposite to the material dispense direction;

a tubular portion mounted on the main body of the housing and formed with an axial bore, said bore having a first section in which the material dispense rod is movable and a second section, each of said bore sections having separate material inlet and outlet openings;

a sleeve telescopically slidably mounted on the tubular portion and movable between material load and dispense positions, said sleeve having a hollow bore formed with an annular inner recess which aligns with the material outlet opening of the first bore section and the material inlet opening of the second bore section when in the material dispense position to provide communication between the first and second bore sections;

a second fluid pressure chamber formed in the housing which is adapted to be connected to a source of fluid pressure;

a second piston movably mounted in the second fluid pressure chamber for moving the sleeve from the material load position to the material dispense position;

second spring means for biasing the sleeve toward the material load position;

material supply means formed on the sleeve for permitting the flow of material into the first bore section of the tubular portion when the sleeve is in the material load position; and said first piston moving the material dispense rod a predetermined stroke length into the first bore section when the sleeve is in the material dispense position to discharge a predetermined amount of material from said first bore section and into the second bore section through the annular inner recess of the sleeve to dispense a measured amount of said material from said second bore section and out of the outlet opening of said second bore section.

19. The dispenser defined in claim 18 including adjustment means engageable with the first piston means for regulating the stroke length of the dispense rod thereby regulating the amount of material being dispensed by said rod.

20. The dispenser defined in claim 18 in which a flexible diaphragm is attached to each of the pistons in their respective pressure chambers.

21. The dispenser defined in claim 18 in which the tubular portion is removably mounted on the main body of the housing by an attachment member.

22. The dispenser defined in claim 18 in which the pressurized fluid is air.

23. The dispenser defined in claim 18 in which the material outlet opening of the second bore section is an open end of said second bore section.

* * * * *